United States Patent
Zhang et al.

(10) Patent No.: US 11,368,202 B2
(45) Date of Patent: Jun. 21, 2022

(54) UE-SPECIFIC BEAM MAPPING WITH REFERENCE WEIGHT VECTORS

(71) Applicant: Nokia Technologies Oy, Espoo (FI)

(72) Inventors: Bulin Zhang, Branchburg, NJ (US); Gurudutt Hosangadi, Hackettstown, NJ (US); Yang Yang, Morris Plains, NJ (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/756,555

(22) PCT Filed: Oct. 19, 2017

(86) PCT No.: PCT/US2017/057347
§ 371 (c)(1),
(2) Date: Apr. 16, 2020

(87) PCT Pub. No.: WO2019/078864
PCT Pub. Date: Apr. 25, 2019

(65) Prior Publication Data
US 2020/0252118 A1    Aug. 6, 2020

(51) Int. Cl.
*H04B 7/06* (2006.01)
*H04B 7/08* (2006.01)

(52) U.S. Cl.
CPC ......... *H04B 7/0634* (2013.01); *H04B 7/0617* (2013.01); *H04B 7/0695* (2013.01); *H04B 7/086* (2013.01)

(58) Field of Classification Search
CPC .. H04B 7/0634; H04B 7/0617; H04B 7/0695; H04B 7/086; H04B 7/0413
See application file for complete search history.

(56) References Cited

U.S. PATENT DOCUMENTS

| | | | | |
|---|---|---|---|---|
| 5,973,643 | A * | 10/1999 | Hawkes | G01S 1/045 342/457 |
| 2010/0029288 | A1 | 2/2010 | Wang et al. | 455/450 |
| 2010/0157924 | A1 | 6/2010 | Prasad et al. | 370/329 |
| 2013/0315156 | A1 | 11/2013 | Xiao et al. | 370/329 |
| 2014/0198866 | A1* | 7/2014 | Miyata | H04L 27/2601 375/260 |
| 2014/0341048 | A1 | 11/2014 | Sajadieh et al. | 370/252 |
| 2015/0230266 | A1 | 8/2015 | Sung et al. | |
| 2017/0288751 | A1 | 10/2017 | Faxer et al. | 5/48 |

FOREIGN PATENT DOCUMENTS

| | | |
|---|---|---|
| CN | 103718473 A | 4/2014 |
| CN | 106575990 A | 4/2017 |

* cited by examiner

*Primary Examiner* — Minh Trang T Nguyen
(74) *Attorney, Agent, or Firm* — Joseph C. Drish; Harrington & Smith (57) ABSTRACT

Methods, apparatuses, and computer program products are described for a user equipment in a wireless communication system with a plurality of user equipment where reference weight vectors orthogonal to each other are selected from a predefined set of directions for reference beams. The inner products of a UE-specific beam weight vector with all reference weight vectors is performed and UE-specific beams are mapped to the set of reference beams. From the set of reference beams, based on the reference beam with largest magnitude of inner product, the direction of the user equipment is determined. Based on that determined direction, the user equipment is instructed in to pair with another user equipment of the plurality.

10 Claims, 3 Drawing Sheets

UE-SPECIFIC BEAM MAPPING WITH REFERENCE WEIGHT VECTORS

CROSS REFERENCE TO RELATED APPLICATION

This patent application is a U.S. National Stage application of International Patent Application Number PCT/US2017/057347 filed Oct. 19, 2017, which is hereby incorporated by reference in its entirety.

TECHNICAL FIELD

This invention relates generally to wireless communication systems related to beamforming and, more specifically, beam mapping with reference weight vectors.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

In a wireless communications system with analog beamforming or digital pre-defined beamforming, it is easy to know the beam direction of each UE. For example, in 5G-TF (technical forum), the UE will report the specific beam based on a downlink beam sweeping signal that is monitors periodically.

However, a report from the UE for a system using UE-specific beamforming might not be available. As such, then the downlink beamforming would have to rely on an uplink measurement.

The UE-specific beam on uplink is formed by estimating the channel structure in terms of beamforming weights based on a reference or pilot signal transmitted by the mobile device. For a time division duplexing (TDD) system, which is expected to be baseline in 5G systems, the derived UL weights can be directly applied on downlink due to channel reciprocity.

But this set of complex weights cannot tell the beam direction directly, meaning that it would be difficult to check the orthogonality of each pair of UEs.

For MU-mMIMO pairing, the beamforming weights determined for each UE can be used to determine UEs suitable for pairing since these weights typically correspond to the principal eigenvectors of the channel. Specifically, it has been established already that the normalized product of weight vectors of 2 UEs represents the overlap of their corresponding beams. If the inner product of two beam weight vectors is small then they are considered to have small interference with each other (quasi-orthogonal) and these two beams will generate large interference if the product is large.

For a system with a large number (N) of connected UEs during scheduling, pairwise orthogonality checks are needed for MU MIMO paring and the number of such check is in the order of N(N−1). However, this calculation can be computationally prohibitive.

One proposal is to reduce the number of UE candidates to schedule but this reduction will reduce MU MIMO pairing opportunities thus reducing the utilization of system capacity.

The current invention moves beyond these techniques.

Abbreviations that may be found in the specification and/or the drawing figures are either defined in the text or defined below in the following list of abbreviations:
2G Second Generation
3G Third Generation
3GPP Third Generation Partnership Project
5G Fifth Generation
5G-NB Fifth Generation Node B
BCI Beam Change Indication
BS Base Station
BSI Beam State Information
BRI Beam Refinement Information
BRS Beam Reference Signal
BRRS Beam Refinement Reference Signal
CQI Channel Quality Indicator
CSI Channel State Information
DL Downlink
eNB or eNodeB Evolved Node B (LTE base station)
EPDCCH Enhanced Physical Downlink Control Channel
E-UTRAN Evolved UTRAN
FDD Frequency Division Duplex
gNB NR/5G Node B
IoT Internet of Things
LTE Long Term Evolution
LTE-A Long Term Evolution-Advanced
LTE-M LTE system to support MTC or M2M
Node B (NB) Node B (base station in UTRAN)
MIMO Multiple In, Multiple Out
mMIMO massive Multiple Input and Multiple Output
MTC Machine Type Communication
MU MIMO Multi-UE Multiple Input and Multiple Output
NB NodeB, base station
QoS Quality of Service
RAT Radio Access Technology
RBI Refinement Beam Index
Rel Release
ReTx Retransmission or retransmitting
Rx, RX Reception or receiving
SB Sweeping Block
SIMO Single Input Single Output
TDD Time Division Duplexing
TS Technical Specification or Technical Standard
TTI Transmission Time Interval
Tx, TX Transmission or transmitting
TXRU Transceiver Unit
UCI Uplink Control Information
UE User Equipment or mobile station
UL Uplink

BRIEF SUMMARY

This section is intended to include examples and is not intended to be limiting. As discussed in detail below, the current invention presents a novel UE-specific beam mapping with reference weight vectors.

By calculating the orthogonality metrics between a UE-specific weight vector and all reference weight vectors and by mapping the UE to a reference beam direction with largest orthogonality metric, the present invention eliminates pairwise UE-specific beam orthogonality check so that the system only needs to re-evaluate the reference beam mapping, allowing a mapping between a user specific beam to fixed reference beam(s) without knowing a scheduling candidate decision.

An example of an embodiment of the current invention is a method that comprises selecting reference weight vectors orthogonal to each other from a predefined set of directions for reference beams for a user equipment in wireless communication system with a plurality of user equipment; performing inner products of an UE-specific beam weight vector with all reference weight vectors; mapping UE-specific beams to the set of reference beams; determining direction of the user equipment based on a reference beam of the set with largest magnitude of inner product; and based on the determined direction, instructing the user equipment to pair with another user equipment of the plurality.

An example of another embodiment of the present invention is an apparatus that comprises at least one processor and at least one memory including computer program code, where the at least one memory and the computer program code are configured, with the at least one processor, to cause the apparatus to perform at least the following: selecting reference weight vectors orthogonal to each other from a predefined set of directions for reference beams for a user equipment in wireless communication system with a plurality of user equipment; performing inner products of an UE-specific beam weight vector with all reference weight vectors; mapping UE-specific beams to the set of reference beams; determining direction of the user equipment based on a reference beam of the set with largest magnitude of inner product; and based on the determined direction, instructing the user equipment to pair with another user equipment of the plurality.

An example of an additional embodiment of the instant invention is a computer program product embodied on a non-transitory computer-readable medium in which a computer program is stored that, when being executed by a computer, is configured to provide instructions to control or carry out at least the following: selecting reference weight vectors orthogonal to each other from a predefined set of directions for reference beams for a user equipment in wireless communication system with a plurality of user equipment; performing inner products of an UE-specific beam weight vector with all reference weight vectors; mapping UE-specific beams to the set of reference beams; determining direction of the user equipment based on a reference beam of the set with largest magnitude of inner product; and based on the determined direction, instructing the user equipment to pair with another user equipment of the plurality.

An example of yet another embodiment of the invention disclosed herein is an apparatus, comprising means for selecting reference weight vectors orthogonal to each other from a predefined set of directions for reference beams for a user equipment in wireless communication system with a plurality of user equipment; means for performing inner products of an UE-specific beam weight vector with all reference weight vectors; means for mapping UE-specific beams to the set of reference beams; means for determining direction of the user equipment based on a reference beam of the set with largest magnitude of inner product; and means for instructing the user equipment to pair with another user equipment of the plurality based on the determined direction.

DETAILED DESCRIPTION OF THE DRAWINGS

The Third Generation Partnership Project (3GPP) LTE-A (Long Term Evolution-Advanced) systems improve spatial multiplexing, multi-user MIMO (MU MIMO) to meet the IMT-Advanced spectral efficiency targets. From the perspective of commercial deployment, the implementation of multi-antenna in evolved Node B (eNB) and user equipment (UE) makes the MU MIMO feasible. Based on the channel correlation, a transmitter serves multiple users on the same time and frequency resource in MU MIMO systems. These prior advances no look to be improved for the next generation of mobile wireless communications, namely 5G and beyond.

In downlink MU MIMO systems, inter-user interference (IUI) from paired user's data stream(s) is the bottleneck of the system throughput. Therefore, user pairing algorithm, which chooses a set of appropriate users to mitigate IUI, is regarded as a key factor to MU MIMO systems. Usually, the user pairing algorithm needs accurate channel state information of all serving users. With full channel matrix information at eNB.

The current invention concerns MU pairing and it can be used for MU with mixture of MIMO and SISO. The invention is for simplifying an orthogonality check between different beamforming but it does not deal with underlying MIMO capacity.

While the invention can be used in all manner of wireless communications, the invention described herein can be applied to current 3G and 4G systems, 5G systems, and to multiple IoT. Thus, the components of the different systems might have a 5G MN equate with a with NB IoT.

Likewise, different types of scenarios within those systems would also be possible. While the present invention is discussed in terms of MU MIMO, it is but one example. In other words, MU MIMO is just an example of application of this invention and this invention can be used for MU with beamforming in general when orthogonality between UEs need to be checked. So MU-SISO or MU with some in MIMO and some in SISO would also apply. Also, the invention would be applicable to IoT and although IoT devices might only use SISO, the invention would still be applicable for MIMO or other scenarios.

Herein, the discussion involves the use of the invention in UL measurement and mostly for TDD. But from recent study of FDD LTE, the uplink measurement based beamforming can be used for FDD system as well. Thus, this UL measurement based does not exclude the FDD.

While the accuracy of beamforming based on UL measurement will depend on mobility of the UE, this invention focuses on the orthogonality check among UEs after the beamforming weight vectors have already obtained by any algorithm. Also, while the discussion herein refers to 4G or 5G cellular communications, the invention can also be applied to other beamforming technologies such as a radar system to track multiple targets.

The method, apparatus, and computer program products described herein are examples of embodiments of the current invention which introduces a set of reference weight vectors corresponding to predefined set of beam directions in multi-user multiple input multiple output (MU MIMO) systems.

To summarize, the invention concerns UE beams with reference beams in MU MIMO systems. As discussed in more detail below, the invention involves calculating the orthogonality metrics between a UE-specific weight vector and all reference weight vectors and mapping the UE to a reference beam direction with largest orthogonality metric.

Specific beam(s) of User Equipment (UE) are mapped to the best reference beam. The reference weight vectors are selected such that they are orthogonal to each other.

The beams referenced by the reference weight vectors have minimum overlap if the distance is far, while the neighboring vectors have some overlap based on the beam width. Inner products of each UE-specific weight vector are performed with all the reference weight vectors to determine its degree of overlap.

The direction of the UE is selected to be in the direction of the reference beam with which it has the largest magnitude of the inner product. The UE-specific beams are mapped to the selected reference beams.

The spatial relation between the UEs is decided by the relation between reference beams they are mapped to. Thus, the method eliminates the pairwise UE-specific beam orthogonality check and the system only needs to re-evaluate the reference beam mapping. Also, the mapping between the user specific beam to the fixed reference beam(s) can be performed without knowledge of the scheduling candidate decision.

Thus, the present invention can provide an efficient method to determine the orthogonality between multiple UEs. Thus, while the discussion below may focus on the method being executed in eNB, the output of this method will impact the UE pairing (for MU MIMO or other scenario). A better MU MIMO pairing will lead to higher throughput for UE and higher throughput of system overall.

Figure 1:
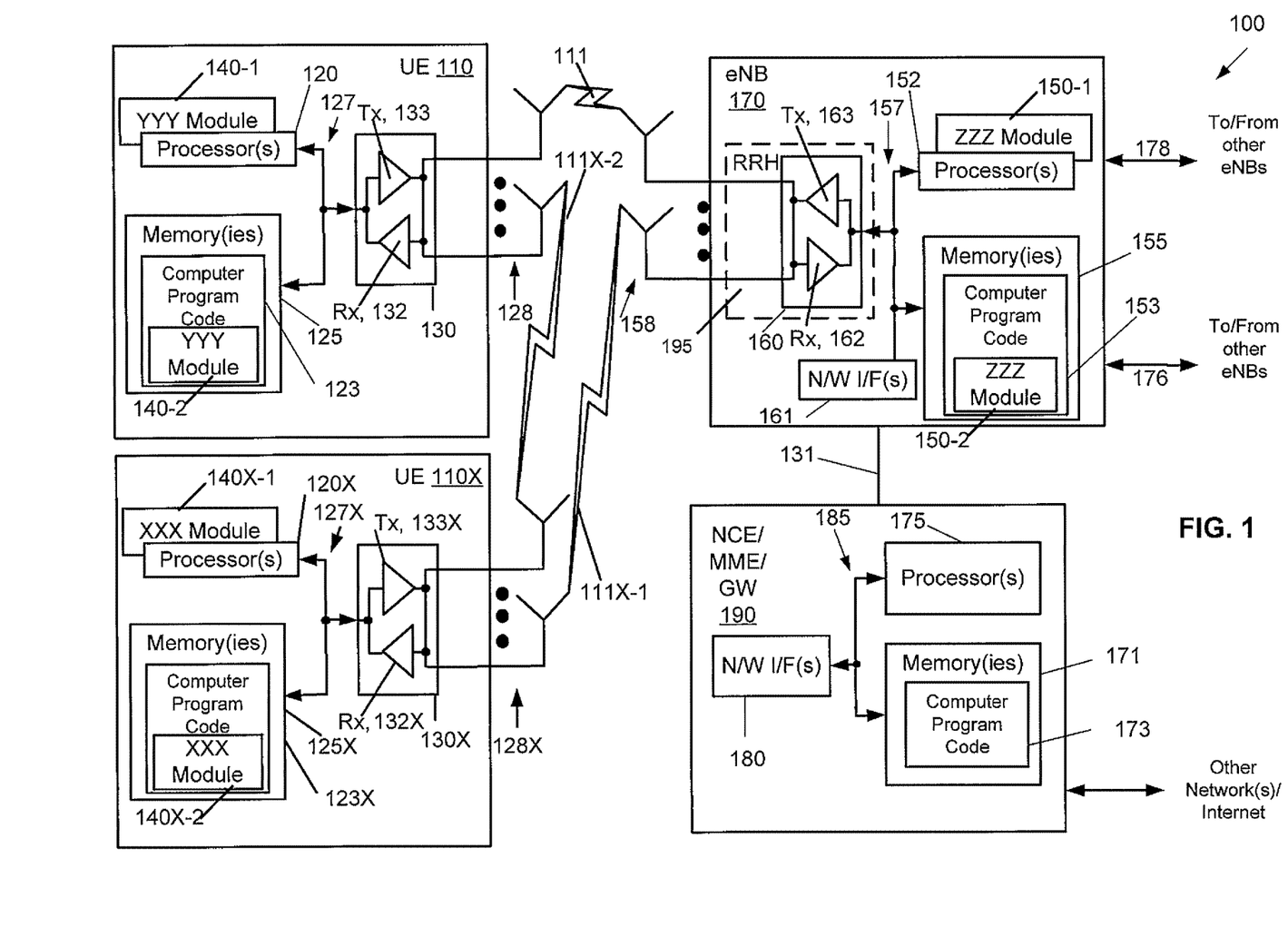
FIG. 1 is a block diagram of one possible and non-limiting exemplary system in which the exemplary embodiments may be practiced.

Before turning to a further discussion of the current invention, we turn to FIG. 1, which is a block diagram of one possible and non-limiting exemplary system in which the exemplary embodiments may be practiced.

Please note that the word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims FIG. 1 shows an exemplary physical embodiment of this invention to be used for 4G/5G product when UE-specific beam is used for digital beamforming. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. Note that the YYY module allows functionality for the usage of control resources for data transmission where any method or examples of such embodiments discussed herein can be practiced. The UE 110 includes a YYY module 140, comprising one of or both parts 140-1 and/or 140-2, which may be implemented in a number of ways. The YYY module 140 may be implemented in hardware as YYY module 140-1, such as being implemented as part of the one or more processors 120. The YYY module 140-1 may be implemented also as an integrated circuit or through other hardware such as a programmable gate array. In another example, the YYY module 140 may be implemented as YYY module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with eNB 170 via a wireless link 111.

The eNB (an evolved NodeB or a New Radio 5G NodeB, which would denoted as gNB, or base station for an IoT system, any of which could be substituted in the proper system for the eNB discussed herein) 170 is a base station (e.g., for LTE, long term evolution, or 5G base station, or an IoT base station equivalent, as would be appropriate for the system) that provides access by wireless devices such as the UE 110 to the wireless network 100. The eNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. Note that the ZZZ module allows functionality for the usage of control resources for data transmission where any method or examples of such embodiments discussed herein can be practiced. The eNB 170 includes a ZZZ module 150, comprising one of or both parts 150-1 and/or 150-2, which may be implemented in a number of ways. The ZZZ module 150 may be implemented in hardware as ZZZ module 150-1, such as being implemented as part of the one or more processors 152. The ZZZ module 150-1 may be implemented also as an integrated circuit or through other hardware such as a programmable gate array. In another example, the ZZZ module 150 may be implemented as ZZZ module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The one or more network interfaces 161 communicate over a network such as via the links 176 and 131. Two or more eNBs 170 communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part as fiber optic cable to connect the other elements of the eNB 170 to the RRH 195.

Turning to the other user equipment in FIG. 1, a UE 110X is in wireless communication with a wireless network 100. The user equipment 110X includes one or more processors 120X, one or more memories 125X, and one or more transceivers 130X interconnected through one or more buses 127X. Each of the one or more transceivers 130X includes a receiver, Rx, 132X and a transmitter, Tx, 133X. The one or more buses 127X may be address, data, or control buses, and may include any interconnection mechanism, such as a series of lines on a motherboard or integrated circuit, fiber optics or other optical communication equipment, and the like. The one or more transceivers 130 are connected to one or more antennas 128X. The one or more memories 125X include computer program code 123X.

The UE 110X includes an XXX module 140X, comprising one of or both parts 140X-1 and/or 140X-2, which may be implemented in a number of ways. The XXX module 140X may be implemented in hardware as XXX module 140X-1, such as being implemented as part of the one or more processors 120X. The XXX module 140X-1 may be implemented also as an integrated circuit or through other hardware such as a programmable gate array. In another example, the XXX module 140X may be implemented as XXX module 140X-2, which is implemented as computer program code 123X and is executed by the one or more processors 120X. For instance, the one or more memories 125X and the computer program code 123X may be configured to, with the one or more processors 120X, cause the user equipment 110X to perform one or more of the operations as described herein. The UE 110X communicates with eNB 170 via a wireless link 111X-1. The remote UE 110 communicates with the relay UEs 110X via a wireless link 111X-2.

It is noted that description herein indicates that "cells" perform functions, but it should be clear that the eNB that forms the cell would perform the functions. The cell makes up part of an eNB. That is, there can be multiple cells per eNB. For instance, there could be three cells for a single eNB carrier frequency and associated bandwidth, each cell covering one-third of a 360-degree area so that the single eNB's coverage area covers an approximate oval or circle. Furthermore, each cell can correspond to a single carrier and an eNB may use multiple carriers. So if there are three 120-degree cells per carrier and two carriers, then the eNB has a total of 6 cells.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization may still be implemented, at some level, using hardware such as processors 152 or 175 and memories 155 and 171, and also such virtualized entities create technical effects.

The computer readable memories 125, 125X, 155 and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 120X, 152, and 175 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments of the user equipment 110 and user equipment 110X can include, but are not limited to, cellular telephones such as smart phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. For example, in an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, as in FIG. 1 for example. A computer-readable medium may comprise a computer-readable storage medium (e.g., memories 125, 125X, 155, 171 or other device) that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

As noted above, this invention would also be appropriate for use in a system comprising an IoT system.

Figure 2:
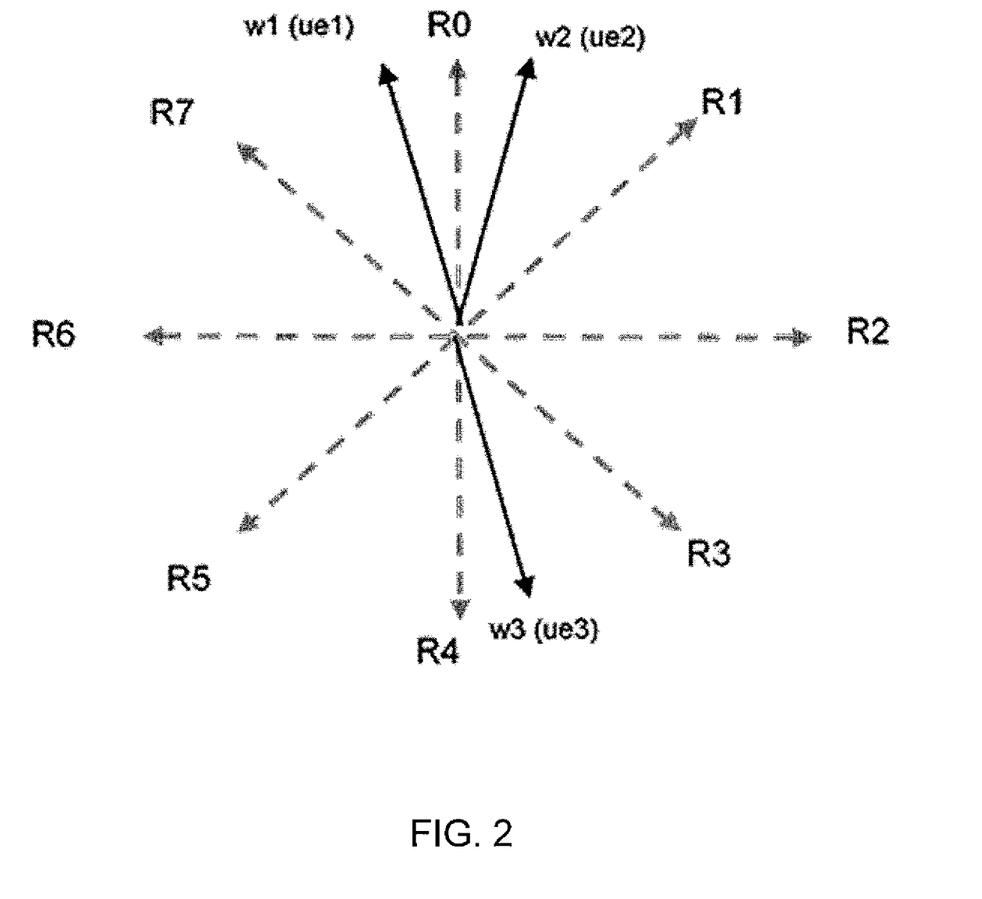
FIG. 2 illustrates UE-specific weight vectors and reference vectors used to determine the direction of UE-specific beam.

Turning to FIG. 2, we show introducing a set of reference weight vectors corresponding to a predefined set of beam directions and use the overlap between UE-specific weight vector and these reference ones to determine the direction of UE-specific beam.

As shown in FIG. 2, a system can pre-define a set of reference weight vectors representing the beams in selected directions.

The reference weight vectors are selected such that they are orthogonal to each other from a mathematical representation. In a physical representation, the beams referenced by the reference weight vectors have minimum overlap if the distance is far while the neighboring vectors are allowed to have some overlap based on the beamwidth.

After performing inner products of an UE-specific beam weight vector with all reference weight vectors, the direction of the UE is said to be in the direction of the reference beam with which it has the largest magnitude of the inner product. For a well-defined beamform, a single distinct peak is expected if the beam is aligned with one of the reference beams. If an UE-specific beam is right in between two reference beams, then two peaks with a similar magnitude would be observed. For an UE with strong multipath fading, where the UE has a well-defined beam shape, the beam derived from UL measurement might manifest peaks with multiple reference beams of distinct directions.

After the UE-specific beams are mapped to reference beam(s), the spatial relation between UEs can readily be decided by the relation between reference beams they belong to. The MU MIMO pairing can be performed the same way as in analog beamforming and there is no need for pairwise check.

Referring to FIG. 2, R0-R7 are reference beams chosen and they are defined by set of weight vectors $R_k$ (where k represents the number of beams). It is assumed that there are N antenna elements in one dimension. For 3 UEs (ue1, ue2, and ue3 pictured), each with its own UE-specific beam, each is represented by weight vector w (here w can also be represented by R). Orthogonality metric:

$$\Gamma_{pq} = \frac{<R_p, R_q>}{\|R_p\|\|R_q\|} \quad \text{where} \quad <a, b> = \sum_{i=1}^{N\_ani\_ele} a_i^{\pm} b_i.$$

A large value suggests high correlation between $R_p$ and $R_q$, where $R_p$ and $R_q$ can be that of a reference beam or UE-specific beam, and where the numerator represent the overlap (interference) while the denominator is the product of the absolute values of $R_p$ and $R_q$, which is a normalization factor. Note in the equations above that p and q are weight vector index for specific UE or that of reference beam, a_i or b_i is the weight on antenna element i for corresponding weight vector, where a is a complex number and a* is complex conjugate of a, where <a,b> represents the summation from i=1 to N_amt_ele, where i is index for antenna element and N_ant_ele denotes the total number of element elements.

Based on the above orthogonality metric, ue1 and ue2 would be mapped to R0 while w3 would be mapped to R4.

This clearly suggests that since ue1 and ue2 are mapped to the same reference vector or beam, they should not be paired together.

This invention introduces the reference beam weight vectors which can be used to map any UE-specific beam. By calculating the orthogonality metrics between an UE-specific weight vector and all reference weight vectors, the UE can be mapped to a reference beam direction with largest orthogonality metrics. This can eliminate the pairwise UE-specific beam orthogonality check which can be very costly for a system with large number of candidates for scheduling.

For each scheduling opportunity, 0.2 ms as in 5G-TF, a system with N=40 candidates need to perform pairwise orthogonality check in the order of 1560 during the 0.2 ms time budget.

With this scheme, a system only need to re-evaluate the reference beam mapping for the user specific beam when the weight vector is changed during UL measurement and it is in the order of 10s or 100s of a millisecond. The number of reference weight vectors for a typical MIMO antenna configuration is in the order up to 10-50.

Importantly, the mapping between the user specific beam to the fixed reference beam(s) can be performed without knowledge of the scheduling candidate decision; hence it can be integrated in the front-end processing of beamforming instead of the critical real-time interval after the scheduling candidate set is determined.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., 104, 134, or other device) that may be any media or means that can contain, store, and/or transport the instructions for use by or in connection with an instruction execution system, apparatus, or device, such as a computer. A computer-readable storage medium does not comprise merely propagating signals.

Figure 3:
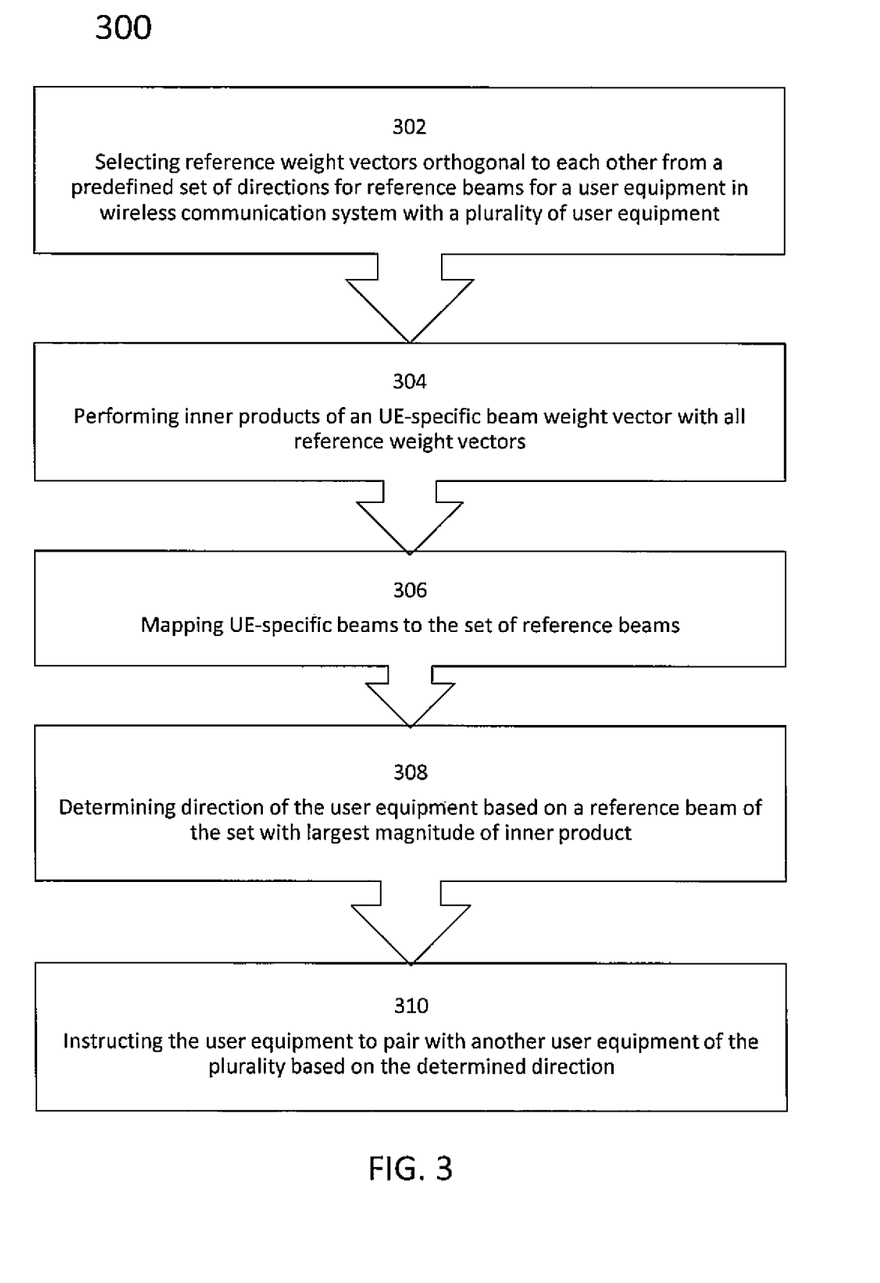
FIG. 3 is a logic flow diagram for dynamic segmentation, and illustrates the operation of an exemplary method, a result of execution of computer program instructions embodied on a computer readable memory, functions performed by logic implemented in hardware, and/or interconnected means for performing functions in accordance with exemplary embodiments.

FIG. 3 is a logic flow diagram for UE beams with reference beams in MU MIMO systems, and illustrates the operation of an exemplary method 300, a result of execution of computer program instructions embodied on a computer readable memory, functions performed by logic implemented in hardware, and/or interconnected means for performing functions in accordance with exemplary embodiments. Parts or all of method 300 could be performed in module XXX, YYY, and/or ZZZ as appropriate.

Turing to FIG. 3, the exemplary method 300 is shown beginning with step 302 of selecting reference weight vectors orthogonal to each other from a predefined set of directions for reference beads for a user equipment in wireless communication system with a plurality of user equipment. In step 304, where inner products of an UE-specific beam weight vector with all reference weight vectors is performed. Step 306 involves mapping UE-specific beams to the set of reference beams. In step 308, the direction of the user equipment is determined based on a reference beam of the set with largest magnitude of inner product. Based on the determined direction, the user equipment is instructed in step 310 to pair with another user equipment of the plurality.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

Without in any way limiting the scope, interpretation, or application of the claims appearing below, an advantage or a technical effect of one or more of the exemplary embodiments disclosed herein means that mapping between a user specific beam to fixed reference beam(s) can be performed without knowing a scheduling candidate decision; due to the processing advantage of the invention, it will improve mMIMO performance.

An example of an embodiment of the current invention, which can be referred to as item 1, is a method that comprises selecting reference weight vectors orthogonal to each other from a predefined set of directions for reference beams for a user equipment in wireless communication system with a plurality of user equipment; performing inner products of an UE-specific beam weight vector with all reference weight vectors; mapping UE-specific beams to the set of reference beams; determining direction of the user equipment based on a reference beam of the set with largest magnitude of inner product; and based on the determined direction, instructing the user equipment to pair with another user equipment of the plurality.

An example of a further embodiment of the current invention, which can be referred to as item 2, is the method of item 1 that further comprises resolving overlap between UE-specific weight vector and these reference weight vectors; and using the overlap to decide direction of UE-specific beam.

An example of a further embodiment of the current invention, which can be referred to as item 3, is the method of item 2, where beams referenced by the reference weight vectors have minimum overlap if the distance is far, and neighboring vectors have some overlap based on the beam width.

An example of a further embodiment of the current invention, which can be referred to as item 4, is the method of any preceding item, where for a well-defined beamform, a single distinct peak is expected if the UE-specific beam is aligned with one of the reference beams.

An example of a further embodiment of the current invention, which can be referred to as item 5, is the method of any preceding item, where for a UE with strong multipath fading and well-defined beam shape, multiple peaks are expected if the UE-specific beam is aligned with multiple reference beams of distinct directions.

An example of a further embodiment of the current invention, which can be referred to as item 6, is the method of any preceding item, where to pair comprises deciding a spatial relation between the user equipment and the other user equipment by a relation between reference beams they belong to.

An example of a further embodiment of the current invention, which can be referred to as item 7, is the method of any preceding item, where to pair can be performed the same way as in analog beamforming and without a need for a pairwise check.

An example of a further embodiment of the current invention, which can be referred to as item 8, is the method of any preceding item, where to pair comprises maximizing signal throughput for user equipments.

An example of a further embodiment of the current invention, which can be referred to as item 9, is the method of item 8, where the wireless communications system is Multi-UE Multiple Input Multiple Output system or a Multi-UE Single Input Single Output system.

An example of a further embodiment of the current invention, which can be referred to as item 10, is the method of any preceding item, where the method is performed by a base station.

An example of another embodiment of the present invention, which can be referred to as item 11, is an apparatus that comprises at least one processor and at least one memory including computer program code, where the at least one memory and the computer program code are configured, with the at least one processor, to cause the apparatus to perform at least the following: selecting reference weight vectors orthogonal to each other from a predefined set of directions for reference beams for a user equipment in wireless communication system with a plurality of user equipment; performing inner products of an UE-specific beam weight vector with all reference weight vectors; mapping UE-specific beams to the set of reference beams; determining direction of the user equipment based on a reference beam of the set with largest magnitude of inner product; and based on the determined direction, instructing the user equipment to pair with another user equipment of the plurality.

An example of another embodiment of the present invention, which can be referred to as item 12, is the apparatus of item 11, where the at least one memory and the computer program code configured to, with the at least one processor, cause the apparatus to further perform at least the following: resolving overlap between UE-specific weight vector and these reference weight vectors; and using the overlap to decide direction of UE-specific beam.

An example of another embodiment of the present invention, which can be referred to as item 13, is the apparatus of item 12, where beams referenced by the reference weight vectors have minimum overlap if the distance is far, and neighboring vectors have some overlap based on the beam width.

An example of another embodiment of the present invention, which can be referred to as item 14, is the apparatus of any of items 11-13, where for a well-defined beamform, a single distinct peak is expected if the UE-specific beam is aligned with one of the reference beams.

An example of another embodiment of the present invention, which can be referred to as item 15, is the apparatus of any of items 11-14, where for a UE with strong multipath fading and well-defined beam shape, multiple peaks are expected if the UP-specific beam is aligned with multiple reference beams of distinct directions.

An example of another embodiment of the present invention, which can be referred to as item 16, is the apparatus of any of items 11-15, where to pair comprises deciding a spatial relation between the user equipment and the other user equipment by a relation between reference beams they belong to.

An example of another embodiment of the present invention, which can be referred to as item 17, is the apparatus of any of items 11-16, where to pair can be performed the same way as in analog beamforming and without a need for a pairwise check.

An example of another embodiment of the present invention, which can be referred to as item 18, is the apparatus of any of items 11-17, where to pair comprises maximizing signal throughput for user equipments.

An example of another embodiment of the present invention, which can be referred to as item 19, is the apparatus of any of items 11-18, where the wireless communications system is Multi-UE Multiple Input Multiple Output system or a Multi-UE Single Input Single Output system.

An example of yet a further embodiment of the instant invention, which can be referred to as item 20, is a computer program product embodied on a non-transitory computer-readable medium in which a computer program is stored that, when being executed by a computer, is configured to provide instructions to control or carry out the method of any of claims 1-10.

An example of an additional embodiment of the instant invention, which can be referred to as item 21, is a computer program comprising: code for selecting reference weight vectors orthogonal to each other from a predefined set of directions for reference beams for a user equipment in wireless communication system with a plurality of user equipment; code for performing inner products of an UE-specific beam weight vector with all reference weight vectors; code for mapping UE-specific beams to the set of reference beams; code for determining direction of the user equipment based on a reference beam of the set with largest magnitude of inner product; and code for instructing the user equipment to pair with another user equipment of the plurality based on the determined direction.

An example of an additional embodiment of the instant invention, which can be referred to as item 22, is the computer program according to item 21, where the computer program is embodied on a computer program product comprising a computer-readable medium bearing the computer program code therein for use with a computer.

An example of a still further embodiment of the present invention, which can be referred to as item 23, is an apparatus comprising means for selecting reference weight vectors orthogonal to each other from a predefined set of directions for reference beams for a user equipment in wireless communication system with a plurality of user equipment; means for performing inner products of an UE-specific beam weight vector with all reference weight vectors; means for mapping UE-specific beams to the set of reference beams; means for determining direction of the user equipment based on a reference beam of the set with largest magnitude of inner product; and means for instructing the user equipment to pair with another user equipment of the plurality based on the determined direction.

An example of a further additional embodiment of the present invention, which can be referred to as item 24, is an apparatus comprising means for performing the method of any items 1-9. If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   selecting reference weight vectors orthogonal to each other from a predefined set of directions for reference beams for a user equipment in a wireless communication system with a plurality of user equipment;
   performing inner products of a user equipment specific beam weight vector with all reference weight vectors;
   mapping user equipment specific beams to the set of reference beams;
   determining direction of the user equipment based on a reference beam of the set with largest magnitude of inner product;
   based on the determined direction, instructing the user equipment to pair with another user equipment of the plurality;
   resolving overlap between the user equipment specific beam weight vector and these reference weight vectors; and
   using the overlap to decide direction of a user equipment specific beam;
   wherein beams referenced by the reference weight vectors have minimum overlap if the distance is far, and neighboring vectors have some overlap based on beam width.

2. The method of claim 1, wherein to pair comprises deciding a spatial relation between the user equipment and the other user equipment by a relation between reference beams they belong to.

3. The method of claim 1, wherein to pair comprises maximizing signal throughput for user equipments.

4. A computer program product embodied on a non-transitory computer-readable medium in which a computer program is stored that, when being executed by a computer, is configured to provide instructions to control or carry out the method of claim 1.

5. An apparatus, comprising circuitry configured to perform the method of claim 1.

6. An apparatus, comprising:

at least one processor; and at least one non-transitory memory including computer program code, the at least one memory and the computer program code configured to, with the at least one processor, cause the apparatus to perform at least:

select reference weight vectors orthogonal to each other from a predefined set of directions for reference beams for a user equipment in a wireless communication system with a plurality of user equipment;

perform inner products of a user equipment specific beam weight vector with all reference weight vectors;

map user equipment specific beams to the set of reference beams;

determine direction of the user equipment based on a reference beam of the set with largest magnitude of inner product;

based on the determined direction, instruct the user equipment to pair with another user equipment of the plurality;

resolve overlap between the user equipment specific beam weight vector and these reference weight vectors; and use the overlap to decide direction of user equipment specific beam;

wherein beams referenced by the reference weight vectors have minimum overlap if the distance is far, and neighboring vectors have some overlap based on beam width.

7. The apparatus of claim 6, wherein to pair comprises deciding a spatial relation between the user equipment and the other user equipment by a relation between reference beams they belong to.

8. The apparatus of claim 6, wherein to pair comprises maximizing signal throughput for user equipments.

9. A non-transitory computer readable medium having a computer program comprising:

code for selecting reference weight vectors orthogonal to each other from a predefined set of directions for reference beams for a user equipment in a wireless communication system with a plurality of user equipment;

code for performing inner products of a user equipment specific beam weight vector with all reference weight vectors;

code for mapping user equipment specific beams to the set of reference beams;

code for determining direction of the user equipment based on a reference beam of the set with largest magnitude of inner product;

code for instructing the user equipment to pair with another user equipment of the plurality based on the determined direction;

code for resolving overlap between the user equipment specific beam weight vector and these reference weight vectors; and code for using the overlap to decide direction of a user equipment specific beam;

wherein beams referenced by the reference weight vectors have minimum overlap if the distance is far, and neighboring vectors have some overlap based on beam width.

10. An apparatus, comprising:

circuitry configured to select reference weight vectors orthogonal to each other from a predefined set of directions for reference beams for a user equipment in a wireless communication system with a plurality of user equipment;

circuitry configured to perform inner products of user equipment specific beam weight vector with all reference weight vectors;

circuitry configured to map user equipment specific beams to the set of reference beams;

circuitry configured to determine direction of the user equipment based on a reference beam of the set with largest magnitude of inner product;

circuitry configured to instruct the user equipment to pair with another user equipment of the plurality based on the determined direction;

circuitry configured to resolve overlap between the user equipment specific beam weight vector and these reference weight vectors; and circuitry configured to use the overlap to decide direction of user equipment specific beam;

wherein beams referenced by the reference weight vectors have minimum overlap if the distance is far, and neighboring vectors have some overlap based on beam width.

* * * * *